(12) United States Patent
Asano et al.

(10) Patent No.: US 7,945,439 B2
(45) Date of Patent: May 17, 2011

(54) INFORMATION PROCESSING APPARATUS, INFORMATION PROCESSING METHOD, AND COMPUTER PROGRAM

(75) Inventors: Yasuharu Asano, Kanagawa (JP); Ugo Di Profio, Kanagawa (JP); Keiichi Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 1012 days.

(21) Appl. No.: 11/760,105

(22) Filed: Jun. 8, 2007

(65) Prior Publication Data

US 2008/0010060 A1  Jan. 10, 2008

(30) Foreign Application Priority Data

Jun. 9, 2006 (JP) ................................ 2006-160710

(51) Int. Cl.
*G10L 15/00* (2006.01)
(52) U.S. Cl. .............................. 704/200; 704/235
(58) Field of Classification Search .................. 704/200, 704/235
See application file for complete search history.

(56) References Cited

U.S. PATENT DOCUMENTS

| | | | |
|---|---|---|---|
| 2006/0028488 A1* | 2/2006 | Gabay et al. | 345/626 |
| 2007/0156726 A1* | 7/2007 | Levy | 707/100 |
| 2007/0192352 A1* | 8/2007 | Levy | 707/102 |
| 2009/0063159 A1* | 3/2009 | Crockett | 704/500 |
| 2009/0106202 A1* | 4/2009 | Mizrahi | 707/3 |
| 2009/0150147 A1* | 6/2009 | Jacoby et al. | 704/235 |

FOREIGN PATENT DOCUMENTS

| | | |
|---|---|---|
| JP | 2001-229180 | 8/2001 |
| JP | 2003-178078 | 6/2003 |
| JP | 2003-228569 | 8/2003 |
| JP | 2003-233624 | 8/2003 |
| JP | 2004-153764 | 5/2004 |

\* cited by examiner

*Primary Examiner* — Daniel D Abebe
(74) *Attorney, Agent, or Firm* — Finnegan, Henderson, Farabow, Garrett and Dunner, L.L.P.

(57) ABSTRACT

Disclosed herein is an information processing apparatus configured to generate metadata corresponding to content including, a data output, a data input section, a control section, an interaction execution section, an interaction metadata generation section, and a content control section.

12 Claims, 8 Drawing Sheets

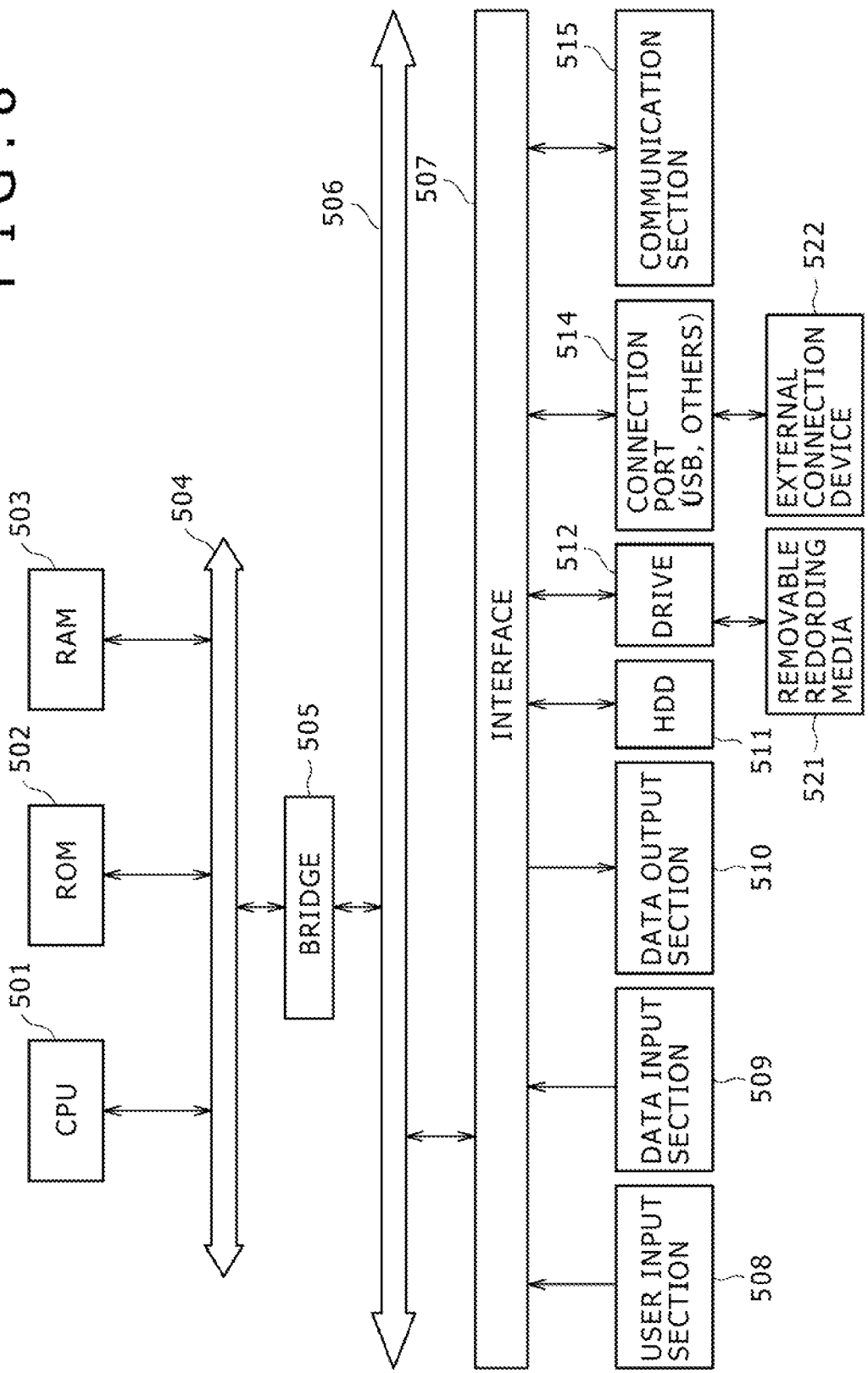

INFORMATION PROCESSING APPARATUS, INFORMATION PROCESSING METHOD, AND COMPUTER PROGRAM

CROSS REFERENCES TO RELATED APPLICATIONS

The present invention contains subject matter related to Japanese Patent Application JP 2006-160710 filed in the Japan Patent Office on Jun. 9, 2006, the entire contents of which being incorporated herein by reference.

BACKGROUND OF THE INVENTION

1. Field of the Invention

The present invention relates to an information processing apparatus, an information processing method, and a computer program, and, more particularly, to an information processing apparatus, an information processing method, and a computer program that are configured to generate and record metadata available for the classification and so on of content including still and moving images.

2. Description of the Related Art

To be more specific, the present invention is related to an information processing apparatus, an information processing method, and a computer program that are configured to, in reproducing content including still and moving images for appreciation, interact with a user, observe the interaction through a camera and a microphone, for example, generate metadata from the information obtained by the observation, use the metadata set through interaction, and analyze content, thereby enhancing the accuracy of the metadata obtained by the analysis.

Recently digital cameras and video cameras have been increasingly growing popular. Users can store content, such as still and moving images taken by use of these devices, into storage media, such as a hard disk drive of a PC (Personal Computer), a DVD, or a flash memory, for example. In order to reproduce or print content stored in these storage media, the user needs to search for desired pieces of content. However, as the number of pieces of content increases, a problem emerges that the extraction of desired pieces of content becomes increasingly difficult.

Normally, each piece of content records attribute information (or metadata), such as a name of content, a data of shooting, and a place of shooting, for example, in correspondence with the substance data of content including still and moving images. The user uses these pieces of metadata for searching for desired pieces of content.

Metadata are largely divided into those which are automatically generated in accordance with the processing of content shooting and others which are given by the user as the information corresponding to shooting data. For example, the information, such as a date of shooting, is one of metadata automatically generated by each camera on the basis of a clock capability thereof. On the other hand, user-generated metadata include various kinds of information, such as place and persons subject to particular shooting operations, episodes involved therein, and so on, in addition to content titles, for example.

However, user-generated metadata required a very labor-taking operation because each user need to provide the above-mentioned metadata to personal content shot and recorded by the user very time shooting and recording are made. For example, in the case of broadcast content, such as television program, a configuration is normally employed in which the transmission source of content or a third party provides various kinds of metadata to viewers as users. Each user can efficiently search for desired programs by use of the provided metadata. However, of the metadata about the personal content obtained by shooting and recording, the setting of those pieces of metadata other than the formal information, such as data of shooting, for example, is required to be executed by the user, which becomes a very cumbersome task as the volume of content increases.

A configuration intended to enable the efficient execution of a metadata providing task, such as described above, by the user is disclosed Japanese patent Laid-open No. 2001-229180 (hereinafter referred to as Patent Document 1). To be specific, Patent Document 1 proposes a configuration in which voice recognition or image recognition is executed on the audio data or image data contained in recorded content, such as taken video data, and the information obtained by the recognition is related with the content as metadata, both the content and the metadata being automatically recorded together. In addition, a configuration in which morphological analysis is executed on text information describing non-text content, such as images, to extract a keyword and the extracted keyword is provided as the metadata corresponding to the content is disclosed in Japanese Patent Laid-open No. 2003-228569 (hereinafter referred to as Patent Document 2).

A method in which audio scenario information prepared in association with content is used to provide words extracted by scenario voice recognition processing as metadata is disclosed in Japanese Patent Laid-open No. 2004-153764 (hereinafter referred to as Patent Document 3). Further, a method in which a biological reaction of a viewer during a period of time of content reproduction is manipulated to provide the resultant data as sensory metadata is disclosed in Japanese patent Laid-open No. 2003-178078 (hereinafter referred to as Patent document 4).

The configuration written in Patent Document 1, namely, a method in which voice recognition and image recognition are applied to content, is convenient because of automatic metadata provision. Unlike professionally shot data, personal content shot by amateur users is often low in image or audio quality. Here emerges a problem that it is difficult to execute data, such as keywords usable as metadata, from such low-quality content by means of voice recognition or image recognition.

The method written in Patent Document 2 in which text information describing non-text content is used involves a problem that this method cannot be applied to any personal content to which no text information is given. The scenario-based configuration disclosed in Patent Document 3 involves a problem that this method is unavailable for any content for which no scenario is recorded beforehand. The method using biological reactions disclosed in Patent Document 4 requires a device for analyzing observed values obtained through a device that is set to each user to obtain biological information, such as blood pressure and blood flow, which cannot be realized with a general-purpose PC, thereby pushing up the cost of realizing the method.

SUMMARY OF THE INVENTION

Therefore, the present invention addresses the above-identified and other problems associated with related-art methods and apparatuses and solves the addressed problems by providing an information processing apparatus, an information processing method, and a computer program that are configured to efficiently generate and record metadata to mitigate user load without resorting to any special devices.

To be more specific, an embodiment of the present invention is to provide an information processing apparatus, an information processing method, and a computer program that are configured to interact with a user when the user reproduces content, such as still and moving images, for appreciation, capture the interaction through a camera and a microphone, for example, generate metadata corresponding to the appreciated content based on the captured information, and record the generated metadata, thereby realizing efficient metadata recording without involving much user load.

In carrying out the invention and according to a first embodiment thereof, there is provided an information processing apparatus configured to generate metadata corresponding to the content. This information processing apparatus has a data output section configured to output reproduced content; a data input section configured to enter at least one of image data and voice data of a user viewing content is entered; a control section configured to determine an action for the user on the basis of information entered through the data input section and reproduced content information; an interaction execution section configured to execute an action determined by the control section; an interaction metadata generation section configured to analyze at least one of input information of a user's image and a user's voice including a result of the interaction obtained through the data input section, thereby generating metadata corresponding to reproduced content; and a content control section configured to record the metadata generated by the interaction metadata generation section as metadata that corresponds to the reproduced content.

In carrying out the invention and according to a second embodiment thereof, there is provided an information processing method configured to generate metadata corresponding to content in an information processing apparatus. This information processing method has the steps of: outputting reproduced content; entering at least one of image data and voice data of a user viewing content is entered; determining an action for the user on the basis of information entered through the data input step and reproduced content information; executing an action determined by the control step; analyzing at least one of input information of a user's image and a user's voice including a result of the interaction obtained in the data input step, thereby generating metadata corresponding to reproduced content; and recording the metadata generated by the interaction metadata generation step as metadata that corresponds to the reproduced content.

In carrying out the invention and according to a third embodiment thereof, there is provided a computer program configured to generate metadata corresponding to content in an information processing apparatus. This computer program has the steps of: outputting reproduced content; entering at least one of image data and voice data of a user viewing content is entered; determining an action for the user on the basis of information entered through the data input step and reproduced content information; executing an action determined by the control step; analyzing at least one of input information of a user's image and a user's voice including a result of the interaction obtained in the data input step, hereby generating metadata corresponding to reproduced content; and recording the metadata generated by the interaction metadata generation step as metadata that corresponds to the reproduced content.

It should be noted that the computer program according to an embodiment of the invention can be provided for computer systems that can execute various types of program codes, in the form of computer-readable storage media, communications media, recording media such as CD, FD, and MO, or communications media such as a network. Providing such a computer program in a computer-readable form allows the realization of the processing according to the program on computer systems.

Many other features, advantages, and additional objects of the present invention will become manifest to those versed the art upon making reference to the detailed description which follows and the accompanying sheet of drawings. It should also be noted that term "system" as used herein denotes a logical set of a plurality of component units and these component units are not necessary accommodated in a same housing.

According to one configuration of one embodiment of the invention, an interaction with a user viewing content can be executed to obtain user's image and voice information at the time of the interaction and extract interaction-base metadata on the basis of the analysis of these items of entered user information, thereby recording the extracted metadata as the metadata corresponding to the content. The above-mentioned novel configuration according to the embodiments of the invention allows the extraction and recording of metadata of content while viewing content in a living room for example without costing the user the load of setting metadata by the user.

In addition, according to one configuration of one embodiment of the invention, the contents of content can be estimated by referencing interaction-base metadata also in the extraction of content-base metadata to execute metadata extraction with restricted dictionaries applied, thereby realizing an information processing apparatus capable of relating accurate content-corresponding metadata with content and recording the obtained metadata and the content together.

BRIEF DESCRIPTION OF THE DRAWINGS

FIG. 8 is a section diagram illustrating an exemplary hardware configuration of the information processing apparatus mentioned above.

DETAILED DESCRIPTION OF THE PREFERRED EMBODIMENTS

This invention will be described in further detail by way of embodiments thereof that are an information processing apparatus, an information processing method, and a computer program, with reference to the accompanying drawings.

The embodiments of the present invention are configured to execute interaction with a user when the user reproduces content, such as still and moving images, for appreciation, capture a way of the interaction through a camera and a microphone, for example, extract metadata corresponding to appreciated content based on the captured information, and record the extracted metadata, thereby realizing an efficient metadata recording capability that does not cost user load.

Figure 1:
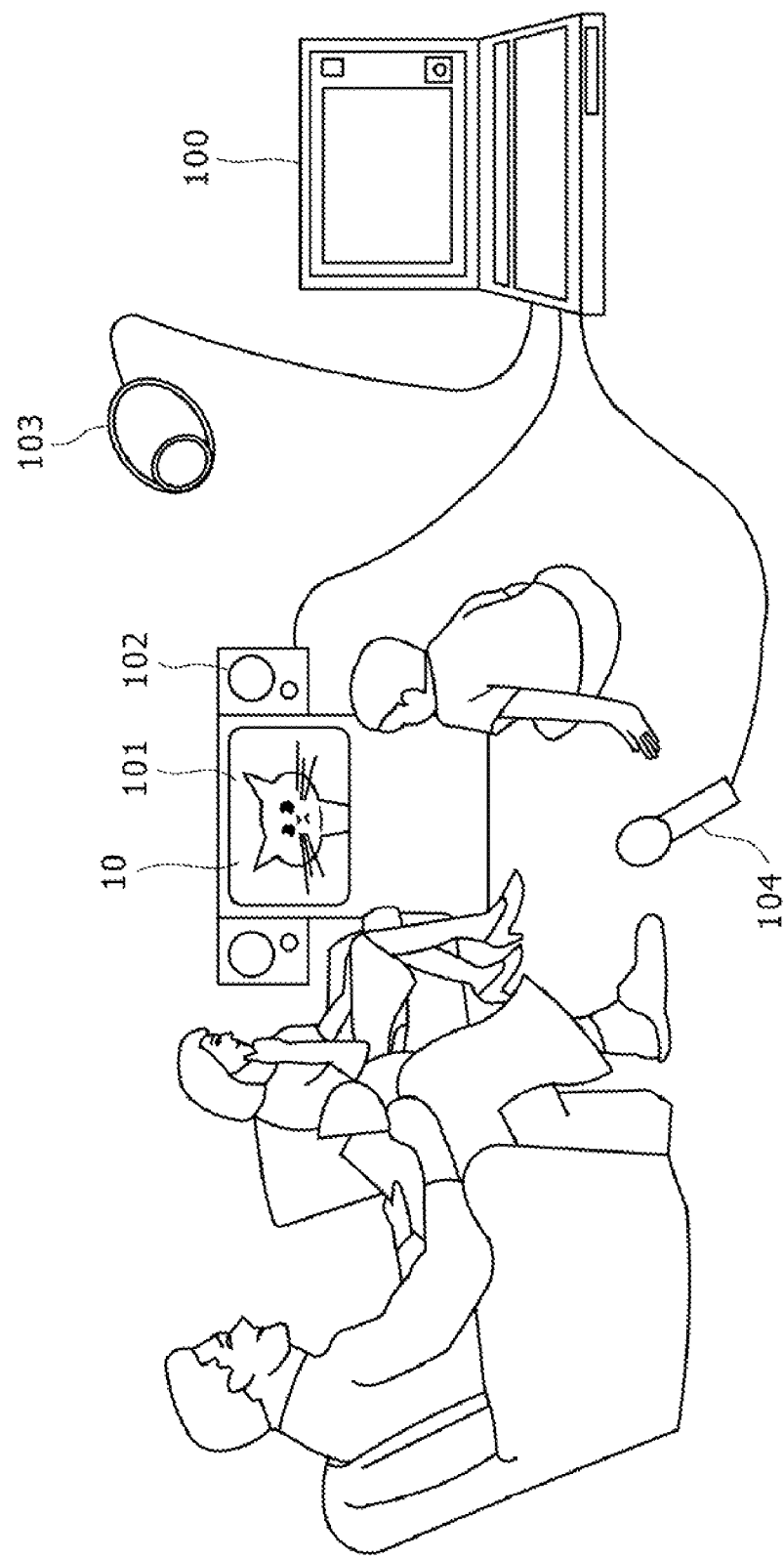
FIG. 1 is a schematic diagram illustrating a usage example of an information processing apparatus according to an embodiment of the invention.

For example, as shown in FIG. 1, content 10, such as a still image or a moving image taken with a digital still camera or a video camera, is reproduced with a display 101 and a loudspeaker 102 of a television set or a personal computer, and a manner in which the reproduced content is being appreciated in a living room is captured with a camera 103 and a microphone 104 to be entered in an information processing apparatus 100.

The information processing apparatus 100 generates interaction data, such as questions to the user on the basis of the reproduced content and input information and puts generated questions to the user through an output section made up of the display 101 and the loudspeaker 102, for example. These questions include one "Have you enjoyed yourself viewing this content?", for example. Further, an answer to this question and an action of the user, for example, are entered through the camera 103 and the microphone 104 into the information processing apparatus 100, the input information is analyzed, the metadata corresponding to the reproduced content is extracted and generated, and the generated metadata is stored in a storage section along with the content.

It should be noted that, with the information processing apparatus according to an embodiment of the present invention, the content to which metadata is given includes not only the personal content, such as images shot by the user, but also any other content, such as moving image and still image content distributed over the Internet, for example.

Figure 2:
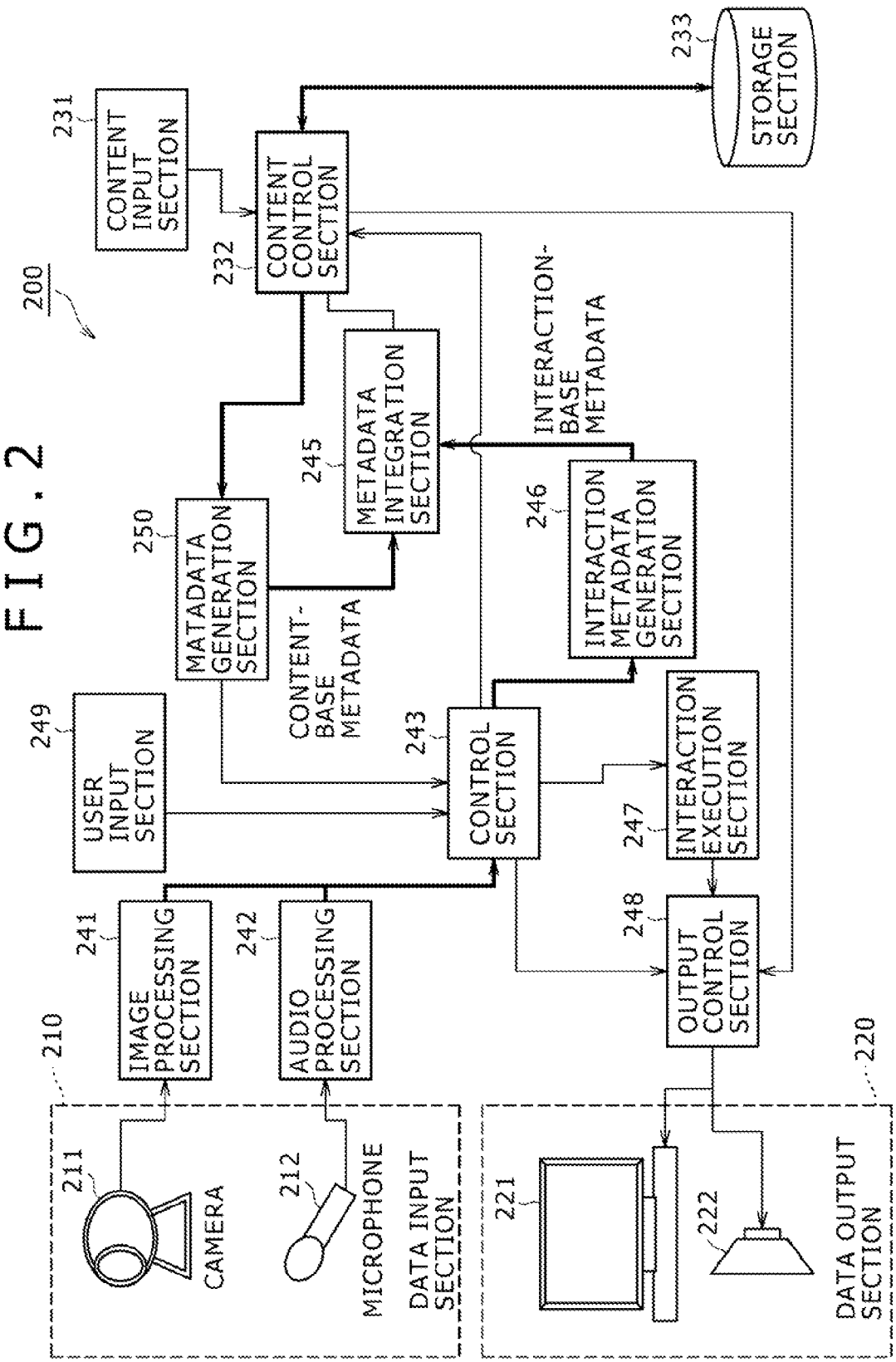
FIG. 2 is a section diagram illustrating a configuration example and a processing example of the information processing apparatus mention above.

The following described a configuration of and processing to be executed by the information processing apparatus according to an embodiment of the present invention, with reference to FIG. 2. FIG. 2 is a section diagram illustrating an exemplary configuration of an information processing apparatus 200. The information processing apparatus 200 enters, through a content input section 231, the content taken by the user through a video camera or a still camera or obtained through the Internet or broadcasting, thereby storing the entered content into a storage section 233 under the control of a content control section 232.

In addition, the information processing apparatus 200 reproduces the content stored in the storage section 233 through a data output section 220 made up of a display 221 and a loudspeaker 222 under the control of an output control section 248, executes an interaction with the user viewing the reproduced content, the presentation of a question to the user and the acquisition of an answer, for example, generates metadata from the information obtained as a result of the interaction, and records the generated metadata to the storage section 233 as the metadata corresponding to the reproduced content.

The following describes the processing to be executed by each of the processing sections shown in FIG. 2. A data input section 210, having a camera 211 and a microphone 212, takes a motion and a countenance of the user viewing the reproduced content through the camera 211 and a voice of the user through the microphone 212. An image processing section 241 executes face recognition and smiling face recognition, for example, on the basis of the image information taken with the camera 211 and outputs results of the processing to a control section 243.

An audio processing section 242 executes voice recognition, speaker recognition, and laughing voice recognition from the audio and voice signal picked up by the microphone 212 and outputs results of the processing to the control section 243.

The content input section 231 obtains content data, such as still and moving images and voice, by means of a memory card, USB-based cable connection, a wireless or wired network, or broadcasting and transmits the obtained content data to the content control section 232. The storage section 233, made up of a recording device such as a hard disk drive, stores content data and metadata.

The content control section 232 receives the content data entered through the content input section 231 and the attribute information (or metadata) corresponding to content created in a metadata integration section 245 and stores the received content data and attribute information into the storage section 233. The metadata, configured by various kinds of information, such as date and place of shooting and user's note, corresponding to content, provides information available as a keyword for use in content search processing, for example. The metadata is recorded as related with the substance data of content, such as still and moving images. The user can execute content search processing on the basis of these metadata.

When a content reproduction request accompanying content specification information based on a user operation is entered through a user input section 249, the control section 243 requests the content control section 232 for reading content data from the storage section 233 and output the read content data. In response to this request, the content control section 232 reads the specified content form the storage section 233 to reproduce the content through the display 221 and the loudspeaker 222 under the control of the output control section 248.

The content control section 232 also outputs the content to be outputted to the output control section 248 to a metadata generation section 250. The metadata generation section 250 executes image recognition and voice recognition, for example, on the content received from the content control section 232 to generate metadata on the basis of the results of the processing. For example, the image recognition processing analyzes the image data to identify an object contained in the image data. To be more specific, an object or objects contained in image data, such as person, scenery, group of people, mountain, house, and car, for example, are identified and a word based on the results of identification is generated to provide metadata. The metadata extracted on the basis of content analysis is supplied to the control section 243 and the metadata integration section 245.

An interaction metadata generation section 246 obtains, through the control section 243, the information about the image analysis result and the voice analysis result obtained in the image processing section 241 and the audio processing section 242. Namely, the interaction metadata generation section 246 generates metadata on the basis of the results of face recognition processing and smiling face recognition processing, voice recognition on the basis of voice information, speaker recognition information, and laughing voice recognition information, for example, and outputs the generated metadata to the metadata integration section 245 as interaction metadata.

For the interaction metadata generated by the interaction metadata generation section 246, a word to be obtained by analyzing an answer to a question made by the information processing apparatus 200 to the user is set; for example, if the user answers word "amusement park" to a question "Where was this picture taken?" Also, words, such as "amusing", "sad", and "terrible", for example, based on the user's countenance taken with the camera 211 are set as interaction metadata.

The metadata integration section 245 executes integration processing on the metadata entered from the metadata generation section 250 and the interaction metadata generation section 246 by taking time information into consideration and outputs the integrated metadata to the content control section 232. The metadata integration section 245 executes metadata integration processing for relating the interaction-base metadata generated by the interaction metadata generation section 246 and the content-base metadata generated by the metadata generation section 250 with the reproduction time information of the reproduced content, for example. The content control section 232 records the resultant metadata to the storage section 233 as the metadata corresponding to the reproduced content.

The metadata integration section 245 integrates the metadata based on different processing operations entered from the metadata generation section 250 and the interaction metadata generation section 246 to relate the integrated metadata with the time information about content reproduction time. To be more specific, these different kinds of metadata are:

(a) metadata based on the content generated by the metadata generation section 250, namely, the content-base metadata obtained by the image analysis the voice analysis for reproduced content; and (b) metadata based on the interaction with the user viewing the reproduced content generated by the interaction metadata generation section 246, namely interaction-base metadata obtained by analyzing the action, countenance and response of the user viewing reproduced content on the basis of the image and voice captured through the camera 211 and the microphone 212.

These two kinds of metadata (a) and (b) are integrated by taking time information into consideration and the resultant integrated metadata is outputted to the content control section 232.

The metadata integration section 245 executes metadata integration processing in which the interaction-base metadata generated by the interaction metadata generation section 246 and the content-base metadata generated by the metadata generation section 250 are related with the reproduction time information of reproduced content. The content control section 232 records these metadata to the storage section 233 as the metadata for reproduced content.

The control section 243 controls the entire system on the basis of the metadata associated with the content currently reproduced and the results of the processing by the image processing section 241 and the audio processing section 242 and transmits these items of information to an interaction execution section 247 as required, thereby prompting the user viewing the content to answer a question made by the information processing apparatus 200.

On the basis of the information provided by the control section 243, the interaction execution section 247 displays a question and image information onto the display 221 as a prompt to the user appreciating the content. Alternatively, the interaction execution section 247 executes a menu display operation through GUI, for example. Further, the interaction execution section 247 generates a question in voice and other voice information by speech synthesis processing and outputs the generated voice information to the output control section 248 to sound from the loudspeaker 222.

The output control section 248 combines the content data entered from the content control section 232 and the data entered from the interaction execution section 247 by means of proper format conversion, outputting the video information to the display 221 and the audio information to the loudspeaker 222.

As shown in FIG. 2, the information processing apparatus 200 has the metadata generation section 250 configured to generate content-base metadata based on the analysis of reproduced content and the interaction metadata generation section 246 configured to generate interaction-base metadata based on the interaction with the user viewing reproduced content.

These two metadata generation sections generate metadata on the basis of image analysis and voice analysis. The metadata generation section 250 executes processing on the basis of the image and voice of content and the interaction metadata generation section 246 generates metadata based on the image and voice entered through the camera 211 and the microphone 212.

Figure 3:
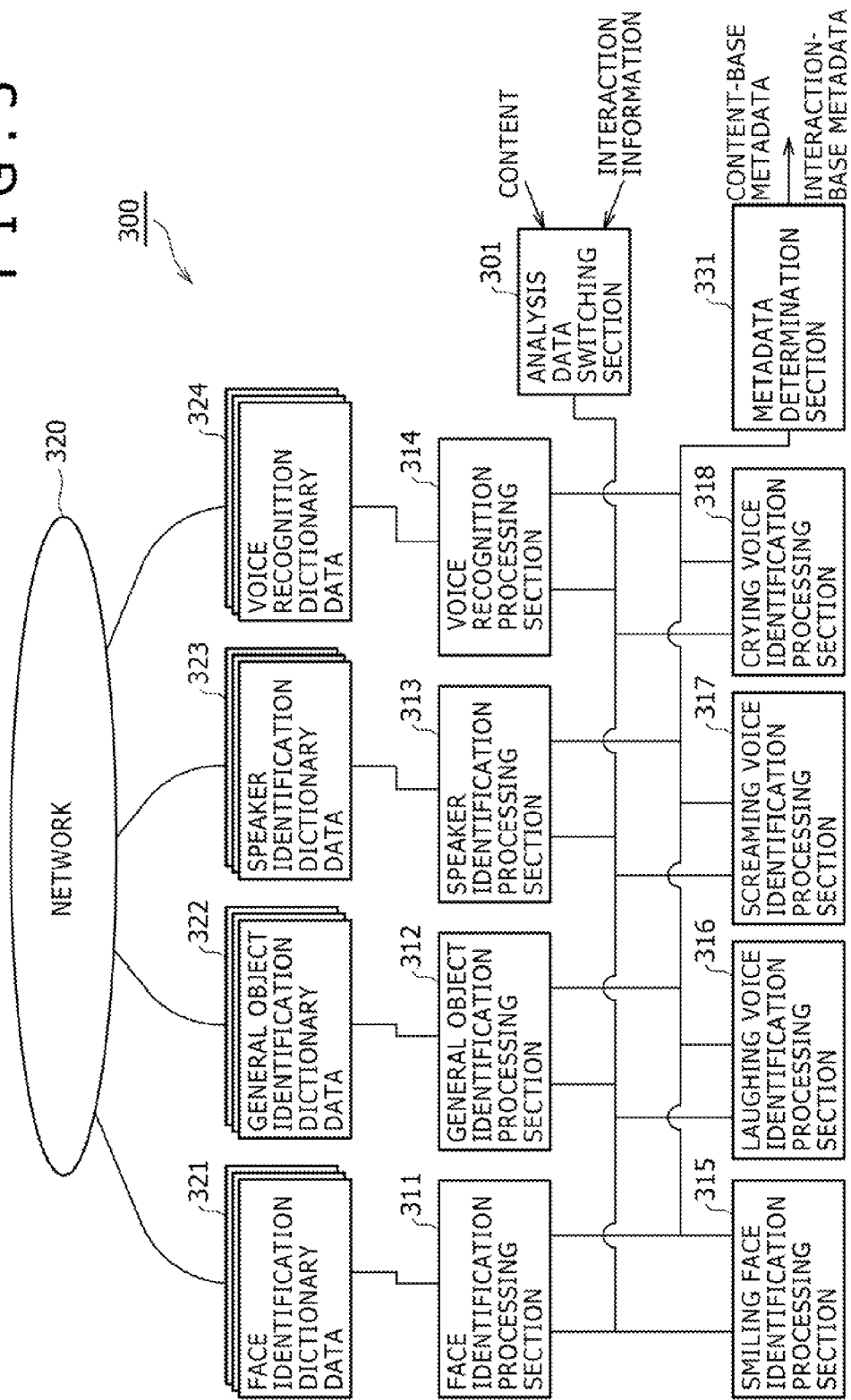
FIG. 3 is a section diagram illustrating a metadata extraction processing configuration example and a processing example of the information processing apparatus mentioned above.

Basically the same technique can be applied to these two metadata processing operations and these two metadata generation sections may be configured as one section to execute metadata generation processing by switching between the subject data as required. FIG. 3 shows an exemplary configuration of a metadata generation section having this data switching configuration.

Referring to FIG. 3, there is shown an exemplary configuration of a metadata generation section 300 configured to execute the two metadata generation capabilities of the metadata generation section 250 shown in and the interaction metadata generation section 246 shown in FIG. 2.

The metadata generation section 300 switches between the data subject to analysis through an analysis data switching section 301. To be more specific, the metadata generation section 300 executes the switching by selecting the data to be entered, namely, content or interaction information, or the taken image or voice information of the content-viewing user.

The analysis data switching section 301 enters one of the content and the interaction information selected as input data into identification processing sections 311 through 318 as instructed by the control section 243. These identification processing sections are a face identification processing section 311, a general object identification processing section 312, a speaker identification processing section 313, a voice recognition processing section 314, a smiling face identification processing section 315, a laughing face identification processing section 316, a screaming voice identification processing section 317, and a crying voice identification processing section 318, as shown.

The face identification processing section 311, the general object identification processing section 312, the speaker identification processing section 313, and the voice recognition processing section 314 each have a dictionary for the identification in accordance with the identification processing or can download such a dictionary from a network site.

The face identification processing section 311 detects a face from the image data supplied as the subject of analysis by use a face identification dictionary 321 and matches the detected face with faces registered in a face identification dictionary data 321. The face identification dictionary data 321 contains face image data to be applied to matching processing and corresponding data, such as names and category names corresponding to registered images, such as personal names and category names (family, co-workers, etc.). The face identification processing section 311 executes matching between the face image extracted from the image data subject to analysis and the face image registered in the face identification dictionary data 321 and, if the similar registered data satisfying the predetermined criteria is detected, outputs the personal name and category name (family, co-worker, etc.) corresponding to that registered metadata to a metadata determination section 331 as a metadata candidate. If the detected face is not registered, this face is outputted as an unregistered face (or an unknown face).

The face identification dictionary data 321 also contains the data registered by the user and the dictionary data downloaded through the network 320, such as the Internet. For example, family faces are registered by the user and the face data of famous people may be obtained through the network 320. The registered data contained in the dictionary includes the face image data and the corresponding data, such as the personal names and category names (family, co-workers, etc.). These data contained in the dictionary are grouped individually by face or by category, such as family, co-worker, etc., the personal names and category names corresponding to the face images being recorded to the dictionary. The face identification processing section 311 executes matching by appropriately switching between the groups of dictionary data.

If a matching image is obtained as a result of the matching processing done in the face identification processing section 311 by use of the face identification dictionary data 321, family names "Taro" and "Hanako" for example, then these words are entered in the metadata determination section 331. The metadata determination section 331 excludes duplicate data with metadata candidates entered from other identification processing for example to determine output metadata, which is outputted to the metadata integration section 245.

The general-object identification processing section 312 extracts a general object from the supplied image data subject to analysis by use of general-object identification dictionary data 322 and matches the extracted general object with the general objects registered in the general-object identification dictionary data 322. General objects include those objects which are not included in personal object, such as cars, mountains, buildings, Tokyo Tower, and amusement parks.

The general-object identification dictionary data 322 contains the general-object image data to be applied to matching processing and the corresponding data, such as names and category names corresponding to the registered images of the names and category names of general objects, such as cars, models of cars, buildings, building names, amusement parks, for example. If similar registered data satisfying predetermined criteria is detected as a result of the matching processing by the general object identification processing section 312 between a general-object image extracted from the image data subject to analysis and the general-object images registered in the general-object identification dictionary data 322, then the general object identification processing section 312 outputs the name and category name related with the detected registered data to the metadata determination section 331 as a metadata candidate.

The general-object identification dictionary data 322 contains user-registered data and dictionary data obtained via the network 320. These data contained in the dictionary are grouped individually by general object or by category. The general object identification processing section 312 executes matching by appropriately switching between the groups of dictionary data.

If a matching image is obtained as a result of the matching processing by the general object identification processing section 312 by use of the general-object identification dictionary data 322, building name "Tokyo Tower" for example is obtained, these words are entered in the metadata determination section 331. Then, after the selection by the metadata determination section 331, a selected metadata candidate is outputted to the metadata integration section 245.

The speaker identification processing section 313 detects a speaker from the supplied voice data subject to analysis by use of speaker identification dictionary data 323 and executes matching between the detected speaker and the speakers registered in the speaker identification dictionary data 323. The speaker identification dictionary data 323 contains the voice data for each speaker to be applied to matching processing and the corresponding data, such as the personal names and category names corresponding to registered voice data of the name of each speaker or category names (family, friend, etc.). If similar registered data satisfying predetermined criteria is detected as a result of the matching by the speaker identification processing section 313 between the speaker voice data extracted from the voice data subject to analysis and the speaker voice data registered in the speaker identification dictionary data 323, the speaker identification processing section 313 outputs the name and category name related with the detected registered data to the metadata determination section 331 as a metadata candidate.

The speaker identification dictionary data 323 contains user-registered data and the dictionary data obtained via the network 320. These data contained in the dictionary are grouped individually by speaker or by category. The speaker identification processing section 313 executes matching by appropriately switching between the groups of dictionary data.

If matching registered voice data is obtained as a result of the matching by the speaker identification processing section 313 by use of the speaker identification dictionary data 323 and the name and category name, "family" for example, is obtained as the registered information corresponding to that voice data, then these words are entered in the metadata determination section 331. Further, after the selection by the metadata determination section 331, the selected word is outputted to the metadata integration section 245.

The voice recognition processing section 314 analyzes the supplied voice data subject to analysis to extract word from the voice data by use of voice recognition dictionary data 324. The voice recognition dictionary data 324 contains the word information to be applied to the matching processing. If similar registered data satisfying predetermined criteria is detected as a result of the matching between the voice data extracted from the voice data subject to analysis and the words registered in the voice recognition dictionary data 324, the voice recognition processing section 314 outputs the detected word as the registered data to the metadata determination section 331 as a metadata candidate.

The voice recognition dictionary data 324 contains user-registered data and the dictionary data obtained via the network 320. These data contained in the dictionary are grouped individually by word or by category. The voice recognition processing section 314 executes matching by appropriately switching between the groups of dictionary data.

If a matching registered word is obtained as a result of the matching by the voice recognition processing section 314 by use of the voice recognition dictionary data 324, the voice recognition processing section 314 outputs the detected word to the metadata determination section 331 as the registered information corresponding to that voice data. Then, after the selection by the metadata determination section 331, the word is outputted to the metadata integration section 245.

The smiling face identification processing section 315 executes image analysis based on the supplied image data subject to analysis to determine whether there is any image area that can be determined as a smiling face. The smiling ace identification processing section 315 holds determination criteria information for smiling-face detection based on image and applies this criteria information to determine whether the supplied image contains a smiling face. If an image found to be a smiling face is detected, the smiling face identification processing section 315 enters registered information, such as "smiling face" and "pleasant" for example, into the metadata determination section 331.

The laughing voice identification processing section 316 executes voice analysis on the supplied voice data subject to analysis to determine whether there is any voice data that is determined to be a laughing voice. The laughing voice identification processing section 316 holds determination criteria information by which to detect a laughing voice from voice data. If the data that is determined to be a laughing voice is detected, the laughing voice identification processing section 316 outputs the registration information, such as "laughing voice" and "pleasant", to the metadata determination section 331 as a metadata candidate corresponding to laughing voice.

The screaming voice identification processing section 317 executes voice analysis on the supplied voice data subject to analysis to determine whether there is any voice data that is determined to be a screaming voice. The screaming voice identification processing section 317 holds the determination criteria information by which to detect a screaming voice from the voice data. If any data that is determined to be a screaming voice, the screaming voice identification processing section 317 outputs the registered information, such as "terror" and "terrible", to the metadata determination section 331 as a metadata candidate corresponding to the screaming voice.

The crying voice identification processing section 318 executes voice analysis on the supplied voice data subject to analysis to determine whether there is any voice data that is determined to be a crying voice. The crying voice identification processing section 318 holds the determination criteria information by which to detect a crying voice from the voice data. If any data that is determined to be a crying voice, the crying voice identification processing section 318 outputs the registered information, such as "sad" and "terrible", to the metadata determination section 331 as a metadata candidate corresponding to the crying voice.

The metadata determination section 331 excludes the duplicate data with the metadata candidates entered from two or more identification processing sections to determine output metadata, which is then outputted to the metadata integration section 245. The metadata integration section 245 integrates the metadata supplied from the metadata generation section 250 and the interaction metadata generation section 246 by taking time information into consideration and outputs the resultant integrated metadata to the content control section 232.

The metadata integration section 245 executes metadata integration processing in which interaction-base metadata generated by the interaction metadata generation section 246 and content-base metadata generated by the metadata generation section 250 are related with the reproduction time information of the reproduced content. The content control section 232 records these metadata to the storage section 233 as the metadata corresponding to the reproduced content.

Figure 4:
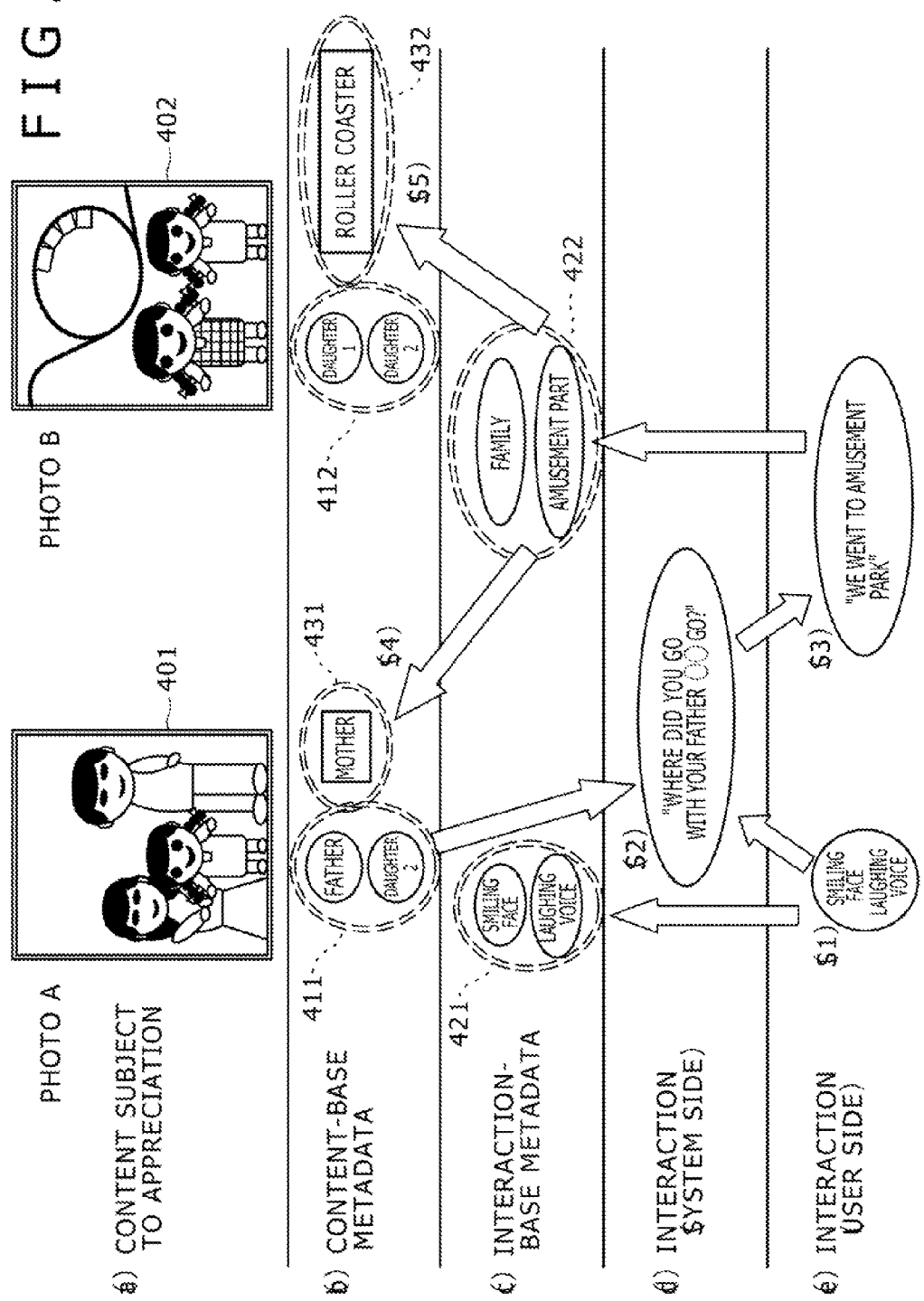
FIG. 4 is a schematic diagram illustrating a metadata extraction processing example of the information processing apparatus mentioned above.

FIG. 4 specifically shows extraction and registration of metadata by way of example. This example is indicative of the setting of metadata in the case where a family is viewing photographs taken with a digital camera in an amusement park visited by the family. From top to bottom in FIG. 4, the following data and processing are shown:

(a) content subject to appreciation;
(b) content-base metadata;
(c) interaction-base metadata;
(d) system-side interaction; and
(e) user-side interaction.

First, when a photograph has been captured from the digital camera into the system (namely, the information processing apparatus), the first content-base metadata is generated. The metadata generation section 250 shown in FIG. 2 analyzes the content stored in the storage section 233 to extract content-base metadata. It should be noted that the metadata generation section 250 shown in FIG. 2 has the configuration described above with reference to FIG. 3, in which various analysis operations are executed on the image data and voice data making up content, thereby extracting metadata.

The metadata generation section 250 has a configuration of the metadata generation section 300 shown in FIG. 3 and executes, through the identification processing sections 311 through 318, processing by use of the dictionary data 321 through 324 and the registered determination criteria information.

In the identification processing by the face identification processing section 311 shown in FIG. 3, "father" and "daughter 2" metadata 411 is set from photograph A401 shown in an example of FIG. 4. As for photograph B402, "daughter 1" and "daughter 2" metadata 412 is set.

Next, if, when the family is appreciating content, a smiling face and a laughing voice are detected (step S1) as a result of the analysis by the interaction metadata generation section 246 from the image obtained through the camera 211 and the voice data obtained through the microphone 212 of the data input section 210 shown in FIG. 2 as the user-side interaction information obtained at the appreciation of photograph A401, for example, "smiling face" and "laughing voice" are extracted as interaction metadata 421.

The processing configuration of the interaction metadata generation section 246 also has the configuration of the metadata generation section 300 shown in FIG. 3 and executes, through the identification processing sections 311 through 318 shown in FIG. 3, generating metadata by use of the dictionary data 321 through 324 and the registered determination criteria information.

Further, the system (or the information processing apparatus) generates a question to the user (step S2) on the basis of the content-base metadata 411 ("father" and "daughter 2") extracted from the photograph A401 and outputs the generated question to the user through the data output section 220. Specifically, the question is outputted to either the display 221 in the form of a message or the loudspeaker 222 in the form of sound.

The question by the system is "Where did you, father and OO (the name of daughter 2) go?", for example.

In response to the question by the system, the mother answers (step S3) by "We went to an amusement park as a family", for example. Then, the microphone 212 of the data input section 210 picks up this answer and enters the picked up answer into the interaction metadata generation section 246. The interaction metadata generation section 246 analyzes the received answer "We went to an amusement park as a family" replied by the mother.

For example, the voice recognition processing by the voice recognition processing section 314 extracts words "family" and "amusement park", which are set as the interaction-base metadata 422.

As described, after the interaction-base metadata 422 is added to the content-base metadata, the system (or the information processing apparatus) extracts content metadata again. This time, because, as a result of the addition of the interaction-base metadata, new information is added to the photograph indicative of family visiting to an amusement park, the system (or the information processing apparatus) uses this new information to execute further content-base metadata extraction processing the metadata generation section 300 having the configuration shown in FIG. 3.

In this metadata extraction processing, the processing is executed by switching between the applicable dictionary data of the identification processing sections 311 through 318 on the basis of the information newly obtained as a result of the interaction. Because "family" and "amusement park" have been obtained as a result of the interaction, a dictionary associated with these data is preferentially selected on the basis of these interaction-base metadata to execute metadata extraction by executing matching between the image and voice data as content and the dictionary registered data.

For example, for the face identification processing section 311 and the speaker identification processing section 313, a dictionary restricted to "family" is used and, for the voice recognition processing section 314 and the general object identification processing section 312, a dictionary containing data associated with "amusement park" is preferentially selected.

As described, the metadata extraction by use of dictionaries associated with the information corresponding to content allows the more accurate extraction and recording of metadata.

With the first capture of content into the system, the metadata extraction was made by use of a general-purpose dictionary, so that only the metadata corresponding to the information registered in that dictionary can be extracted. Referencing interaction-base metadata as the information corresponding to new information obtained as a result of interaction allows the selection of an optimum dictionary in accordance with the situation in which the content was taken. Consequently, the analysis, or the identification, of images and voices by use of such an optimum dictionary allows the extraction of content metadata more accurately.

In the example shown in FIG. 4, this new metadata extraction processing allows the extraction of new metadata;

(step S4) metadata "mother" 431 for the photograph A401 and (step S5) metadata "roller coaster" 432 for photograph B402, thereby recording the extracted metadata as the metadata corresponding to the content.

The metadata thus extracted is recorded to the storage section 233 as the metadata corresponding to that content.

Because photograph A and photograph B can be determined to belong to the same event from the picture taking date that is the data automatically attached to each photograph at the time of shooting, the interaction-base metadata 422 can be attached to both the photograph.

For the photograph A401, content-base metadata 411 and 431 and interaction-base metadata 421 and 422 are recorded. For the photograph B402, the content-base metadata 412 and 432 and interaction-base metadata 422 are recorded.

The following describes various processing sequences (A) through (C) to be executed in the information processing apparatus according to an embodiment of the present the invention.

Figure 5:
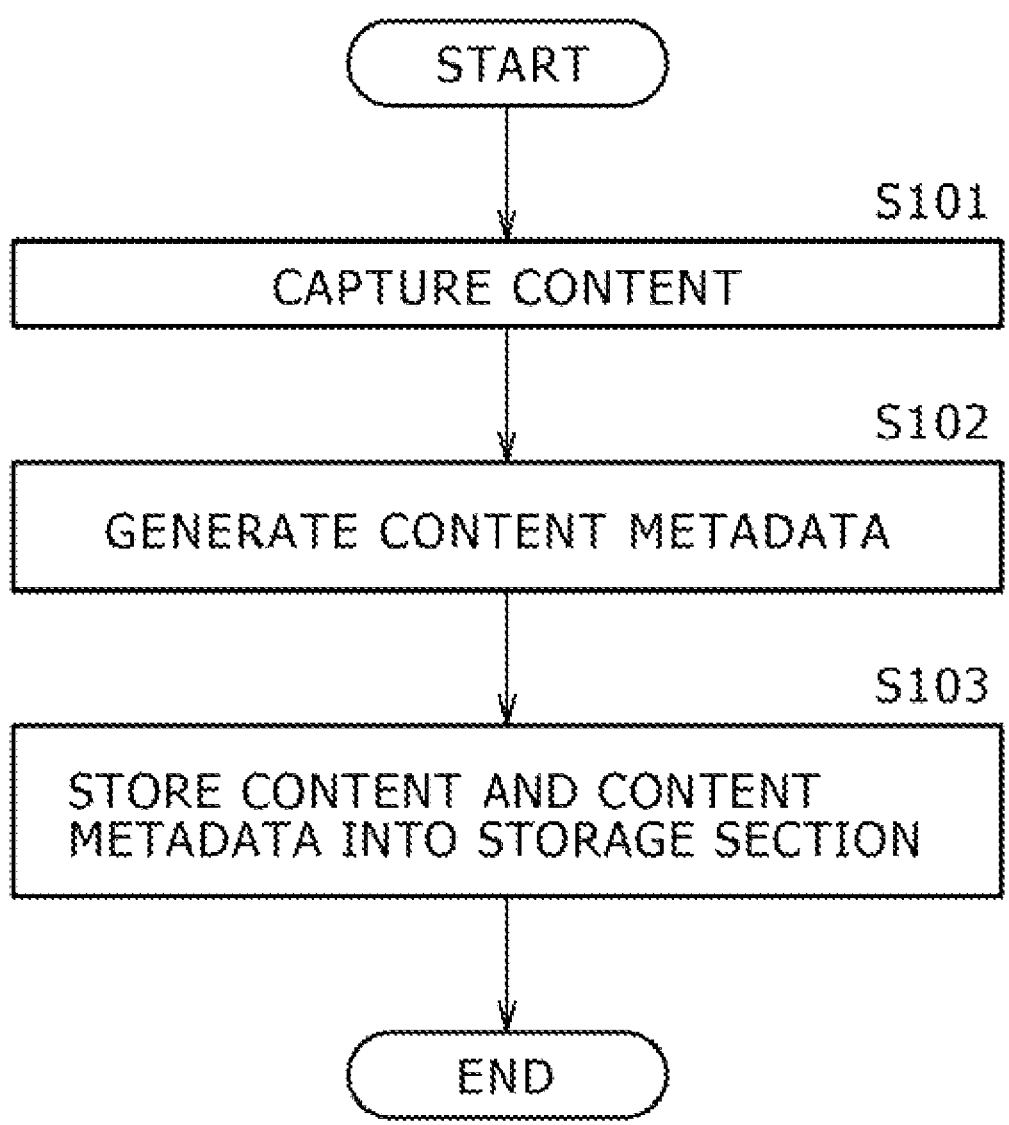
FIG. 5 is a flowchart indicative of a processing sequence that takes place at the time of entering content with the information processing apparatus mentioned above.
Figure 6:
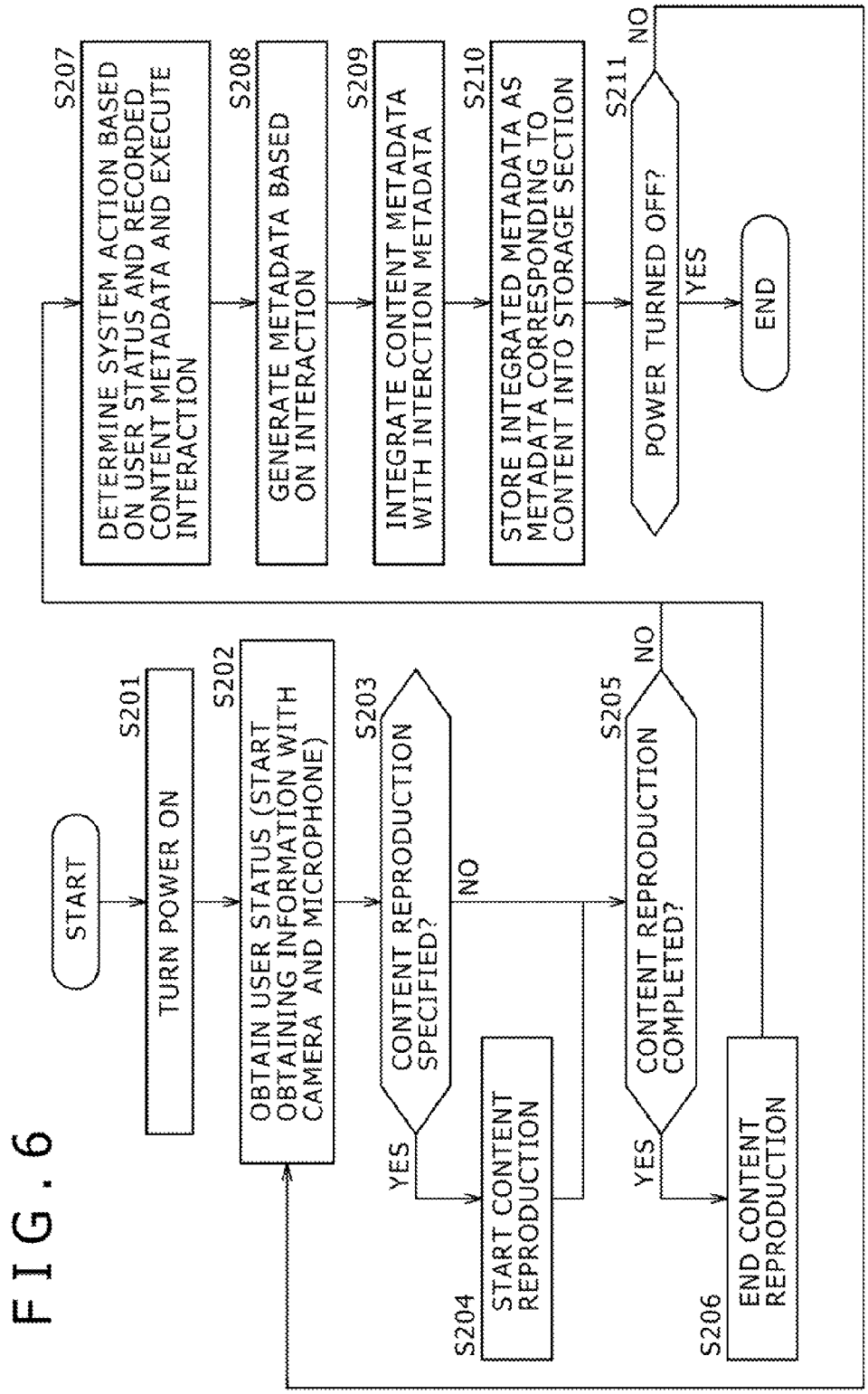
FIG. 6 is a flowchart indicative of a processing sequence that takes place at the time of content appreciation with the information processing apparatus mentioned above.
Figure 7:
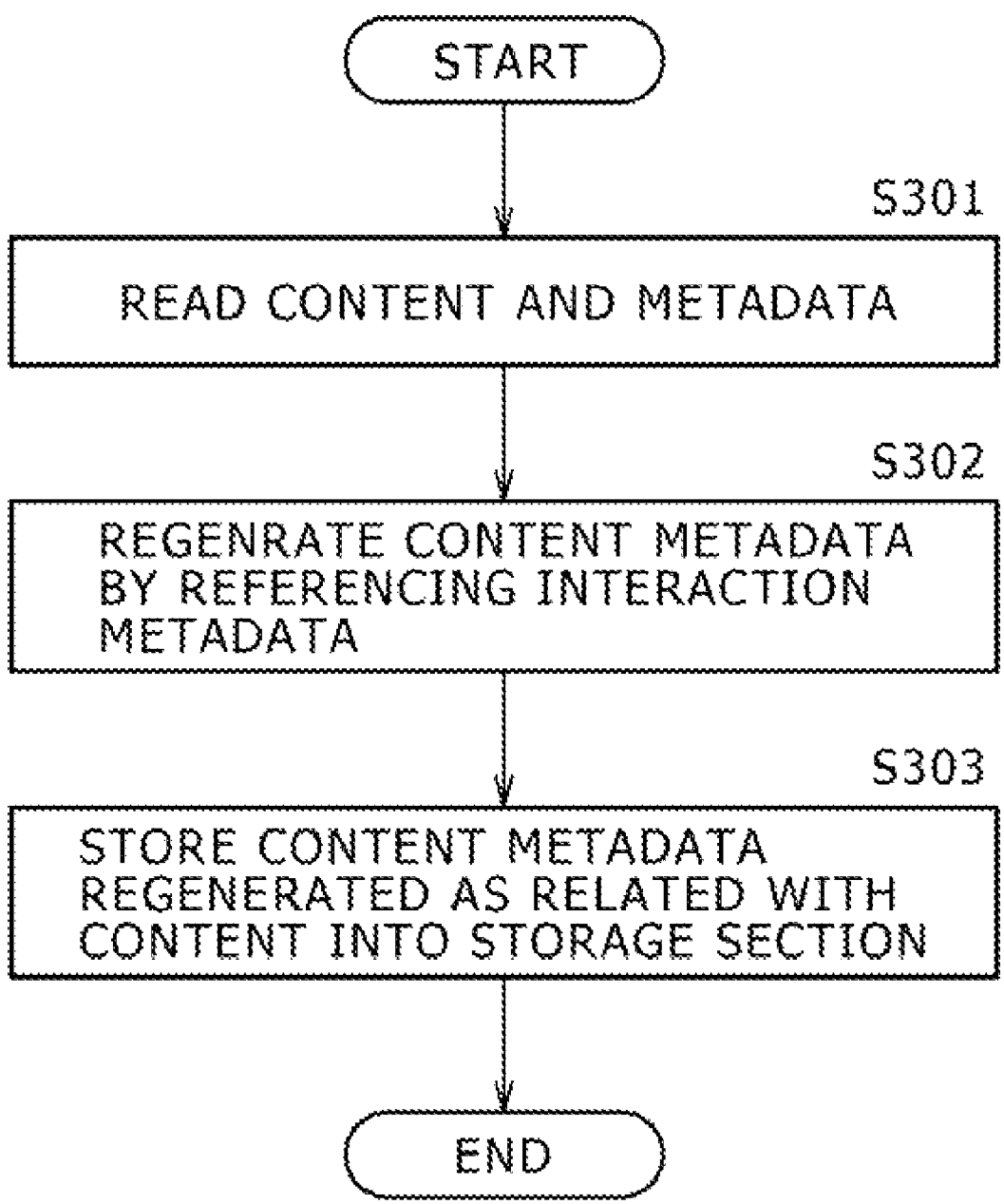
FIG. 7 is a flowchart indicative of a metadata re-extraction processing sequence that takes place after interaction processing of the information processing apparatus mentioned above.

(A) a sequence to be executed at content input processing (FIG. 5);

(B) a sequence to be executed at content appreciation processing (FIG. 6); and (C) a metadata re-extraction processing sequence to be executed after interaction processing (FIG. 7).

(A) A sequence to be executed at content input processing:

First, a sequence to be executed at content input processing will be described with reference to a flowchart shown in FIG. 5. When content is captured in the information processing apparatus through the content input section 231 shown in FIG. 2 in step S101, the input content data is supplied to the metadata generation section 250 through the content control section 232.

In step S102, the metadata generation section 250 extracts content-base metadata by analyzing the image and voice information forming the content. Namely, the metadata generation section 250 having the configuration shown in FIG. 3 generates content-base metadata through the identification processing sections 311 through 318 shown in FIG. 3 by use of the dictionary data 321 through 324 and the predetermined determination criteria information.

In step S103, the content-base metadata generated by the metadata generation section 250 is supplied to the content control section 232 to be stored in the storage section 233 as the metadata corresponding to the content along with the content data.

(B) A sequence to be executed at content appreciation processing:

The following describes a sequence to be executed at content appreciation processing with reference to a flowchart shown in FIG. 6. First, when the user powers on the information processing apparatus in step S201, then the observation of the user through the camera 211 and the microphone 212 of the data input section 210 starts in step S202. This processing continues until the information processing apparatus is powered off.

The user wanting to view content specifies the reproduction of content through the microphone 212 or the user input section 249 (a remote controller for example). If the control section 243 determines that the content reproduction command has been entered in step S203, then the procedure goes to step S204. In step S204, the control section 243 instructs the content control section 232 to reproduce content. In response, the content control section 232 reads the specified content data from the storage section 233 and reproduce the content data through the data output section 220.

If the control section 243 determines in step S205 that a content reproduction end command has been entered, then the procedure goes to step S206. In step S206, the control section 243 instructs the content control section 232 to end the reproduction of content. In response, the content control section 232 ends the processing of reading content from the storage section 233.

The processing of steps S207 and on is the processing of getting interaction-base metadata based on the interaction between the information processing apparatus and the user. This processing continues until the information processing apparatus is powered off. Although this processing may be executed only during the reproduction of content, this content is executable regardless of the reproduction of content. In the flow shown in FIG. 6, this processing is executed regardless of the reproduction of content.

In step S207, the control section 243 controls the entire system by use of the user status that can be predicted from a result of the processing by the image processing section 241 of an input image from the 211 and a result of the processing by the audio processing section 242 of the audio data entered through the microphone 212 and by use of the content metadata extracted from the content being reproduced and instructs the interaction execution section 247 to execute a proper interaction with the user, the generation and output of a question, for example. In response, the interaction execution section 247 executes an interaction, such as presenting a question to the user, on the basis of the data supplied from the control section 243. To be more specific, the interaction execution section 247 executes the processing of presenting a GUI image onto the display 221 of the data output section 220 and outputting speech synthesis data through the loudspeaker 222.

It should be noted that, as described above with reference to FIG. 4, at the time of the execution of an interaction, the content-base metadata previously set to content and user action information are used. In an example in which the content metadata given beforehand is used, the interaction execution section 247 executes the processing of putting a question to the user "When was this photograph taken", for example, if a commemorative photograph has been detected from a still image taken with a digital camera for example and "family" and family names are registered as the content-base metadata corresponding to that content.

In response to this question, the user answers "This photograph was taken in an amusement park" for example, which is entered in the information processing apparatus through the microphone 212. Then, the interaction metadata generation section 246 executes voice recognition processing on the entered voice data and converts the recognized voice data into a text in step S208, which is generated as metadata, for example.

The generation of interaction-base metadata by the interaction metadata generation section 246 in step S208 includes not only the processing described above with reference to FIG. 4 but also the following processing of extracting the data shown below to provide metadata. Namely, (a) content reproduction time;
(b) person viewing content;
(c) content watching time;
(d) direction of sight line of content viewing person;
(e) who spoke what when; and
(f) emotions such as laughing voice, smiling face, and crying voice, etc.

These items of information are extracted by the interaction metadata generation section 246. The content reproduction time of (a) is measured by using the timer information held in the information processing apparatus. The information items (b) through (d) are obtained by the identification processing sections of the configuration shown in FIG. 3.

In step S209, the metadata integration section 245 integrates the interaction-base metadata extracted by the interaction metadata generation section 246 and the content-base metadata extracted from content by the metadata generation section 250, thereby providing integrated metadata.

The metadata integration section 245 executes metadata integration processing so as to relate the interaction-base metadata generated by the drive control section 236 and the content-base metadata generated by the metadata generation section 250 with the reproduction time information of reproduced content. Namely, the metadata integration section 245 integrates metadata such that the information indicative of which metadata has been obtained while reproducing which part of a moving image or recorded content.

If user's speech contents are included in metadata, the metadata integration section 245 executes processing of converting the speech into Japanese kanji-kana text by use of so-called major lexical continuous speech recognition, extracting only keywords in a speech, and converting into a text in the form of phoneme and syllable.

Lastly, in step S210, the content control section 232 stores, in the storage section 233, a result of the integration of the interaction-base metadata extracted by the interaction metadata generation section 246 and the content-base metadata extracted by the metadata generation section 250 on the basis of content, as related with the content data. The processing described above is repeatedly executed until the information processing apparatus is determined powered off in step S211.

(C) A metadata re-extraction processing sequence to be executed after interaction processing:

The following describes a metadata re-extraction processing sequence to be executed after the interaction processing with reference to a flowchart shown in FIG. 7. This processing can be executed in the background when the information processing apparatus is in the power-off status and therefore no interaction is being made with the user, for example. It should be noted that, the timing of the execution is not restricted to that mentioned above; it is also practicable to execute this processing concurrently with the extraction of interaction-base metadata described above with reference to FIG. 6.

First, in step S301, under the control of the control section 243, the content and the metadata recorded as content-related information are entered from the storage section 233 into the metadata generation section 250. This metadata contains both the interaction-base metadata extracted by the interaction metadata generation section 246 and the content-base metadata extracted by the metadata generation section 250 on the basis of content.

In step S302, the metadata generation section 250 analyzes the image and voice data forming the content through the identification processing sections 311 through 318 as described above with reference to FIG. 3, thereby generating the content metadata corresponding to that content.

As described above, in this processing, a dictionary associated with the content is selected by referencing the interaction metadata, for example, thereby executing the processing corresponding to the content.

For example, in metadata generation at the time of entering content as described above with reference to the flowchart shown in FIG. 5, there is no interaction metadata, so that metadata extraction with a general dictionary applied is necessary to be executed. For example, in the face identification processing based on image data, face identification processing is executed by use of a dictionary containing general face data; in the identification processing with voice data applied, voice recognition is executed also by use of a general dictionary.

On the other hand, if a type of content can be estimated by interaction metadata, it is practicable to restrict applicable dictionaries on the basis of the estimated information. In the example described above with reference to FIG. 4, "family" and "amusement park" have been obtained as interaction-base metadata as a result of the interaction, so that the metadata extraction processing can be executed by matching the image and voice data as content with the preferentially selected dictionary registered data associated with these interaction-base metadata.

For example, if metadata, such as "office" and "party", are set as interaction-base metadata as a result of an interaction, face image recognition can be executed by use of a dictionary containing only the face data of office-associated people on the basis of this metadata, thereby enhancing the recognition ratio to provide more accurate metadata extraction and recording.

Lastly, in step S303, the generated content-base metadata is stored in the storage section 233 along with the content data under the control of the content control section 232.

As described above, the information processing apparatus according to an embodiment of the present invention can not only extract and record content-base metadata obtained by analyzing content data but also execute an interaction with the user viewing content, for example, to obtain the image and voice information of the user at the time of the interaction to extract interaction-base metadata on the basis of the analysis of these items of obtained information and estimate the contents of the content by referencing the extracted interaction-base metadata, thereby extracting metadata by use of restricted dictionaries to set and record the metadata of higher accuracy corresponding to the content. In addition, the novel configuration according to an embodiment of the present invention allows the extraction and recording of metadata while viewing content in a living room for example without costing the user any load of setting metadata by the user, for example.

Lastly, the following describes an exemplary hardware configuration of the information processing apparatus that executes the above-described processing with reference to FIG. 8. A CPU (Central Processing Unit) 501 executes the processing corresponding to an OS (Operating System), namely, controls the data processing sections described in the above-mentioned embodiment of the invention. To be more specific, the CPU 501 executes the extraction and recording of content-base metadata on the basis of content, interactions with the user, and the generation and recording of interaction-base metadata on the basis of interactions. These processing operations are executed as instructed by computer programs stored in the ROM and the data storage section, such as a hard disc drive, of each information processing apparatus, for example.

A ROM (Read Only Memory) 502 stores programs to be executed by the CPU 501 and computational parameters for example necessary for the execution. A RAM (Random Access Memory) 503 store programs to be executed by the CPU 501 and parameters that change from time to time during the execution. These components are interconnected by a host bus 504 made up of a CPU bus, for example.

The host bus 504 is connected to an external bus 506, such as a PCI (Peripheral Component Interconnect/Interface) bus, via a bridge 505.

A user input section 508, based on a keyboard and a pointing device, for example, provides an input device that is operated by the user. A data input section 509 is made up of the camera 211 and the microphone 212 shown in FIG. 2. A data output section 510 is made up of the display 221 and the loudspeaker 222 shown in FIG. 2.

A HDD (Hard Disc Drive) 511 drives a built-in hard disc to record or reproduce programs to be executed by the CPU 501, for example. The hard disc is used as a storage device for storing content and metadata, for example and various computer programs, such as data processing programs.

A drive 512 reads data or programs recorded to a removable media 521, such as a magnetic disc, an optical disc, a magneto-optical disc, or a semiconductor memory that is loaded on the drive 512 and supplies the data or programs to the RAM 503 connected via an interface 507, the external bus 506, the bridge 505, and the host bus 504.

A connection port 514 is used to connect to an externally connected device 522 and has a connection section, such as USB, IEEE1394 or the like. The connection port 514 is connected to the CPU 501 and so on via the interface 507, the external bus 506, the bridge 505, and the host bus 504. A communications section 515 is connected to a network. For example, dictionary data to be obtained for metadata extraction processing may be entered in the system through the communications section 515.

It should be noted that the exemplary hardware configuration of the information processing apparatus shown in FIG. 8 is an example based on a PC and therefore not restricted to the configuration shown in FIG. 8; for example, any information processing apparatuses are applicable as far as these apparatuses are capable of executing the above-mentioned processing.

While preferred embodiments of the present invention have been described using specific terms, such description is for illustrative purpose only, and it is to be understood that changes and variations may be made without departing from the spirit or scope of the following claims.

The above-mentioned sequence of processing operations may be executed by software as well as hardware or the combination of both. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

For example, programs can be recorded to a hard disk drive or the ROM as recording media beforehand. Alternatively, programs can be temporarily or permanently stored (or recorded) in removable recording media, such as a flexible disc, a CD-ROM (Compact Disc Read Only Memory), an MO (Magneto-Optical) disc, a DVD (Digital Versatile Disc), a magnetic disc, and a semiconductor memory. These removable recording media can be provided as so-called package software.

It should be noted that, in addition to the installation from removable recording media such as mentioned above into a computer, programs may be downloaded from a download site into a computer in a wireless manner or via a network such as LAN (Local Area Network) or the Internet in a wired manner. The computer receives downloaded programs and records them into incorporated recording media such as a hard disc.

It should be noted that the various kinds of processing operations described herein include not only the processing operations which are sequentially executed in a time-dependent manner but also the processing operations which are executed concurrently or discretely. It should also be noted that term "system" as used herein denotes a logical set of a plurality of component units and these component units are not necessary accommodated in a same housing.

As described above and according to one embodiment of the invention, an interaction with a user viewing content can be executed to obtain user's image and voice information at the time of the interaction and extract interaction-base metadata on the basis of the analysis of these items of entered user information, thereby recording the extracted metadata as the metadata corresponding to the content. The above-mentioned novel configuration according to an embodiment of the present invention allows the extraction and recording of metadata of content while viewing content in a living room for example without costing the user the load of setting metadata by the user.

In addition, according to one embodiment of the invention, the contents of content can be estimated by referencing interaction-base metadata also in the extraction of content-base metadata to execute metadata extraction with restricted dictionaries applied, thereby realizing an information processing apparatus capable of relating accurate content-corresponding metadata with content and recording the obtained metadata and the content together.

It should be understood by those skilled in the art that various modifications, combinations, sub-combinations and alterations may occur depending on design requirements and other factors in so far as they are within the scope of the appended claims or the equivalents thereof.

What is claimed is:

1. An information processing apparatus configured to generate metadata corresponding to content comprising:
    a data output section configured to output reproduced content;
    a data input section configured to enter at least one of image data and voice data of a user viewing content is entered;
    a control section configured to determine an action for said user on the basis of information entered through said data input section and reproduced content information;
    an interaction execution section configured to execute an action determined by said control section;
    an interaction metadata generation section configured to analyze at least one of input information of a user's image and a user's voice including a result of said interaction obtained through said data input section, thereby generating metadata corresponding to reproduced content; and
    a content control section configured to record said metadata generated by said interaction metadata generation section as metadata that corresponds to said reproduced content.

2. The information processing apparatus according to claim 1, wherein said interaction metadata generation section is configured to execute at least one of identification and recognition processing operations of face identification processing, general-object identification processing, smiling face identification processing, speaker identification processing, voice recognition processing, laughing voice identification processing, screaming voice identification processing, and crying voice identification processing, thereby extracting metadata on the basis of these identification and recognition processing operations.

3. The information processing apparatus according to claim 1, further comprising:
    a metadata generation section configured to generate metadata based on image data and voice data making up content,
    said metadata generation section configured to generate content-base metadata by matching one of image data and voice data forming content with dictionary data, said matching being executed by selecting an applicable dictionary on the basis of content information estimated on the basis of said metadata generated by said interaction metadata generation section.

4. The information processing apparatus according to claim 3, wherein said metadata generation section is configured to execute at least one of identification and recognition processing operations of face identification processing, general-object identification processing, smiling face identification processing, speaker identification processing, voice recognition processing, laughing voice identification processing, screaming voice identification processing, and crying voice identification processing, thereby extracting metadata on the basis of these identification and recognition processing operations.

5. The information processing apparatus according to claim 1, further comprising:
    a metadata integration section configured to relate metadata generated in said information processing apparatus with reproduction time information of reproduced content.

6. The information processing apparatus according to claim 1, wherein said control section generates a question to said user as an action for said user on the basis of input information obtained through said data input section and reproduced content information;
    said interaction execution section outputs, through said data output section, said question determined by said control section; and
    said interaction metadata generation section obtains one of a reaction and an answer to said question through said data input section to generate metadata corresponding to said reproduced content on the basis of the analysis of the obtained information.

7. An information processing method configured to generate metadata corresponding to content in an information processing apparatus comprising the steps of:
    outputting reproduced content;
    entering at least one of image data and voice data of a user viewing content is entered;
    determining an action for said user on the basis of information entered through said data input step and reproduced content information;
    executing an action determined by said control step;
    analyzing at least one of input information of a user's image and a user's voice including a result of said interaction obtained in said data input step, thereby generating metadata corresponding to reproduced content; and
    recording said metadata generated by said interaction metadata generation step as metadata that corresponds to said reproduced content.

8. The information processing method according to claim 7, wherein said interaction metadata generation step executes at least one of identification and recognition processing operations of face identification processing, general-object identification processing, smiling face identification processing, speaker identification processing, voice recognition processing, laughing voice identification processing, screaming voice identification processing, and crying voice identification processing, thereby extracting metadata on the basis of these identification and recognition processing operations.

9. The information processing method according to claim 7, further comprising the step of:
    generating metadata based on image data and voice data making up content,
    said metadata generating step being configured to generate content-base metadata by matching one of image data and voice data forming content with dictionary data, said matching being executed by selecting an applicable dictionary on the basis of content information estimated on the basis of said metadata generated by said interaction metadata generation step.

10. The information processing method according to claim 9, wherein said metadata generating step executes at least one of identification and recognition processing operations of face identification processing, general-object identification processing, smiling face identification processing, speaker identification processing, voice recognition processing, laughing voice identification processing, screaming voice identification processing, and crying voice identification processing, thereby extracting metadata on the basis of these identification and recognition processing operations.

11. The information processing method according to claim 7, further comprising the step of:

relating metadata generated in said information processing apparatus with reproduction time information of reproduced content.

12. The information processing method according to claim 7, wherein said control step generates a question to said user as an action for said user on the basis of input information obtained through said data input step and reproduced content information;

said interaction execution step outputs, through said data output section, said question determined by said control step; and said interaction metadata generation step obtains one of a reaction and an answer to said question through said data input step to generate metadata corresponding to said reproduced content on the basis of the analysis of the obtained information.

* * * * *